US008862976B1

(12) United States Patent
Fishkin

(10) Patent No.: US 8,862,976 B1
(45) Date of Patent: Oct. 14, 2014

(54) METHODS AND SYSTEMS FOR DIAGNOSING DOCUMENT FORMATTING ERRORS

(75) Inventor: Kenneth Fishkin, Seattle, WA (US)

(73) Assignee: Google Inc., Mountain View, CA (US)

(*) Notice: Subject to any disclaimer, the term of this patent is extended or adjusted under 35 U.S.C. 154(b) by 564 days.

(21) Appl. No.: 12/758,681

(22) Filed: Apr. 12, 2010

(51) Int. Cl.
*G06F 17/20* (2006.01)

(52) U.S. Cl.
USPC ........... 715/204; 715/202; 715/264; 715/277; 715/523

(58) Field of Classification Search
CPC ............................ G06F 9/4448; G06F 17/2211
USPC .............. 715/202, 277, 204, 264, 523; 704/2; 707/522
See application file for complete search history.

(56) References Cited

U.S. PATENT DOCUMENTS

| | | | | |
|---|---|---|---|---|
| 6,151,022 | A * | 11/2000 | Alshibani et al. | 715/788 |
| 6,226,407 | B1 * | 5/2001 | Zabih et al. | 382/209 |
| 6,519,557 | B1 * | 2/2003 | Emens et al. | 704/8 |
| 6,560,620 | B1 * | 5/2003 | Ching | 715/229 |
| 7,886,267 | B2 * | 2/2011 | Pratt et al. | 717/104 |
| 8,000,528 | B2 * | 8/2011 | Ming et al. | 382/173 |
| 8,136,031 | B2 * | 3/2012 | Massand | 715/229 |
| 2002/0002567 | A1 * | 1/2002 | Kanie et al. | 707/513 |
| 2002/0193983 | A1 * | 12/2002 | Tokieda et al. | 704/2 |
| 2004/0223648 | A1 * | 11/2004 | Hoene et al. | 382/218 |
| 2006/0217954 | A1 * | 9/2006 | Koyama et al. | 704/2 |
| 2007/0050182 | A1 * | 3/2007 | Sneddon et al. | 704/2 |

FOREIGN PATENT DOCUMENTS

EP 1217536 A2 * 6/2002

OTHER PUBLICATIONS

Clark, "xml Path Language (XPATH)" Version 1.0, W3C Recommendation Nov. 16, 1999, Copyright 1999, downloaded Jul. 21, 2010, 37 pgs., http://www.w3.org/TR/xpath.
"Lint Source Code Checker," C User Guide, Chapter 6, downloaded Jul. 26, 2010, 32 pgs., Copyright 2000, Sun Microsystems, Inc., 3 pgs. http://docs.sun.com/source/806-3567/lint.html.
How Selenium Works, http://seleniumhq.org/about/how.html, Dec. 11, 2008, 3 pgs.
Selenium History, http://seleniumhq.org/about/history.html, Dec. 11, 2008, 4 pgs.

* cited by examiner

*Primary Examiner* — Stephen Hong
*Assistant Examiner* — Brian Garmon
(74) *Attorney, Agent, or Firm* — Remarck Law Group PLC

(57) ABSTRACT

In one aspect of a computer-implemented method of diagnosing formatting errors in document renderings, first and second renderings of a document are generated that correspond respectively to first and second locales. A first difference in a display characteristic of a first textual element of the document in the second rendering as compared to the first rendering is identified based on a first predefined criterion. A report is generated specifying the first textual element as having the first difference. In another aspect of the method, a rendering of a document is generated that corresponds to a locale. It is determined that a first element of the document having a first element type has a format in the rendering distinct from a format associated with the first element type in the locale. A report is generated specifying that the first element has a potential formatting error.

21 Claims, 10 Drawing Sheets

Bounding Box Dimensions Table 400

| | Location Descriptor (404) | Height (406) | Width (408) |
|---|---|---|---|
| Textual Element 1 (402) | Location Descriptor | Height | Width |
| Textual Element 2 | Location Descriptor | Height | Width |

Figure 4A

Criteria Specification Table 420

| | Location Descriptor (424) | Flag for 1st Criterion (426) | Flag for 2nd Criterion (428) | ... |
|---|---|---|---|---|
| Textual Element 1 (422) | Location Descriptor | Flag for 1st Criterion | Flag for 2nd Criterion | ... |
| Textual Element 2 | Location Descriptor | Flag for 1st Criterion | Flag for 2nd Criterion | ... |

Figure 4B

Differences Table 440

| | Location Descriptor (444) | Warning Code (446) |
|---|---|---|
| Difference 1 (442) | Location Descriptor | Warning Code |
| Difference 2 | Location Descriptor | Warning Code |

Figure 4C

Locale Formatting Table 460

| | Locale Name (464) | Numerical Format (466) | Currency Symbol (468) | Date Format (470) | Unit of Measure (472) | |
|---|---|---|---|---|---|---|
| Locale 1 (462) | Locale Name | Numerical Format | Currency Symbol | Date Format | Unit of Measure | ... |
| Locale 2 | Locale Name | Numerical Format | Currency Symbol | Date Format | Unit of Measure | ... |

Figure 4D

METHODS AND SYSTEMS FOR DIAGNOSING DOCUMENT FORMATTING ERRORS

TECHNICAL FIELD

The disclosed embodiments relate generally to rendering documents, and more particularly, to diagnosing potential formatting errors in document renderings.

BACKGROUND

Verifying the formatting of different renderings of a document for different locales presents significant challenges. For example, the number of different renderings may be too large for manual verification to be practical. Also, tools that detect differences between renderings at the pixel level are not practical, because pixel-level changes are expected for different renderings and thus do not provide a useful indication of potential formatting errors.

SUMMARY

In some embodiments, a computer-implemented method of diagnosing formatting errors in document renderings is performed in a computer system. In the method, a first rendering and a second rendering of a document are generated. The first rendering corresponds to a first locale. The second rendering corresponds to a second locale. A first difference in a display characteristic of a first textual element of the document in the second rendering as compared to the first rendering is identified based on a first predefined criterion. A report is generated specifying the first textual element as having the first difference.

In some embodiments, a computer-implemented method of diagnosing formatting errors in document renderings is performed in a computer system. In the method, a rendering of a document is generated. The rendering corresponds to a locale. It is determined that a first element of the document having a first element type has a format in the rendering distinct from a format associated with the first element type in the locale. A report is generated specifying that the first element has a potential formatting error.

In some embodiments, a system for diagnosing formatting errors in document renderings includes memory, a display, one or more processors, and one or more programs stored in the memory and configured for execution by the one or more processors. The one or more programs include instructions to generate a first rendering of a document and a second rendering of the document. The first rendering corresponds to a first locale. The second rendering corresponds to a second locale. The one or more programs also include instructions to identify a first difference in a display characteristic of a first textual element of the document in the second rendering as compared to the first rendering, based on a first predefined criterion. The one or more programs further include instructions to generate a report specifying the first textual element as having the first difference.

In some embodiments, a system for diagnosing formatting errors in document renderings includes memory, a display, one or more processors, and one or more programs stored in the memory and configured for execution by the one or more processors. The one or more programs include instructions to generate a rendering of a document. The rendering corresponds to a locale. The one or more programs also include instructions to determine that a first element of the document having a first element type has a format in the rendering distinct from a format associated with the first element type in the locale. The one or more programs further include instructions to generate a report specifying that the first element has a potential formatting error.

In some embodiments, a computer readable storage medium stores one or more programs configured to be executed by a computer system to diagnose formatting errors in document renderings. The one or more programs include instructions to generate a first rendering of a document and a second rendering of the document. The first rendering corresponds to a first locale. The second rendering corresponds to a second locale. The one or more programs also include instructions to identify a first difference in a display characteristic of a first textual element of the document in the second rendering as compared to the first rendering, based on a first predefined criterion. The one or more programs further include instructions to generate a report specifying the first textual element as having the first difference.

In some embodiments, a computer readable storage medium stores one or more programs configured to be executed by a computer system to diagnose formatting errors in document renderings. The one or more programs include instructions to generate a rendering of a document. The rendering corresponds to a locale. The one or more programs also include instructions to determine that a first element of the document having a first element type has a format in the rendering distinct from a format associated with the first element type in the locale. The one or more programs further include instructions to generate a report specifying that the first element has a potential formatting error.

BRIEF DESCRIPTION OF THE DRAWINGS

FIG. 4A is a diagram illustrating a data structure for storing dimensions of document elements in accordance with some embodiments.

FIG. 4B is a diagram illustrating a data structure for specifying the application of predefined criteria to document elements in accordance with some embodiments.

FIG. 4C is a diagram illustrating a data structure listing potential formatting errors in accordance with some embodiments.

FIG. 4D is a diagram illustrating a data structure for specifying locale-specific formats of document elements in accordance with some embodiments.

Like reference numerals refer to corresponding parts throughout the drawings.

DESCRIPTION OF EMBODIMENTS

Reference will now be made in detail to various embodiments, examples of which are illustrated in the accompanying drawings. In the following detailed description, numerous specific details are set forth in order to provide a thorough understanding of the present inventions. However, it will be apparent to one of ordinary skill in the art that the present inventions may be practiced without these specific details. In other instances, well-known methods, procedures, components, and circuits have not been described in detail so as not to unnecessarily obscure aspects of the embodiments.

Figure 1:
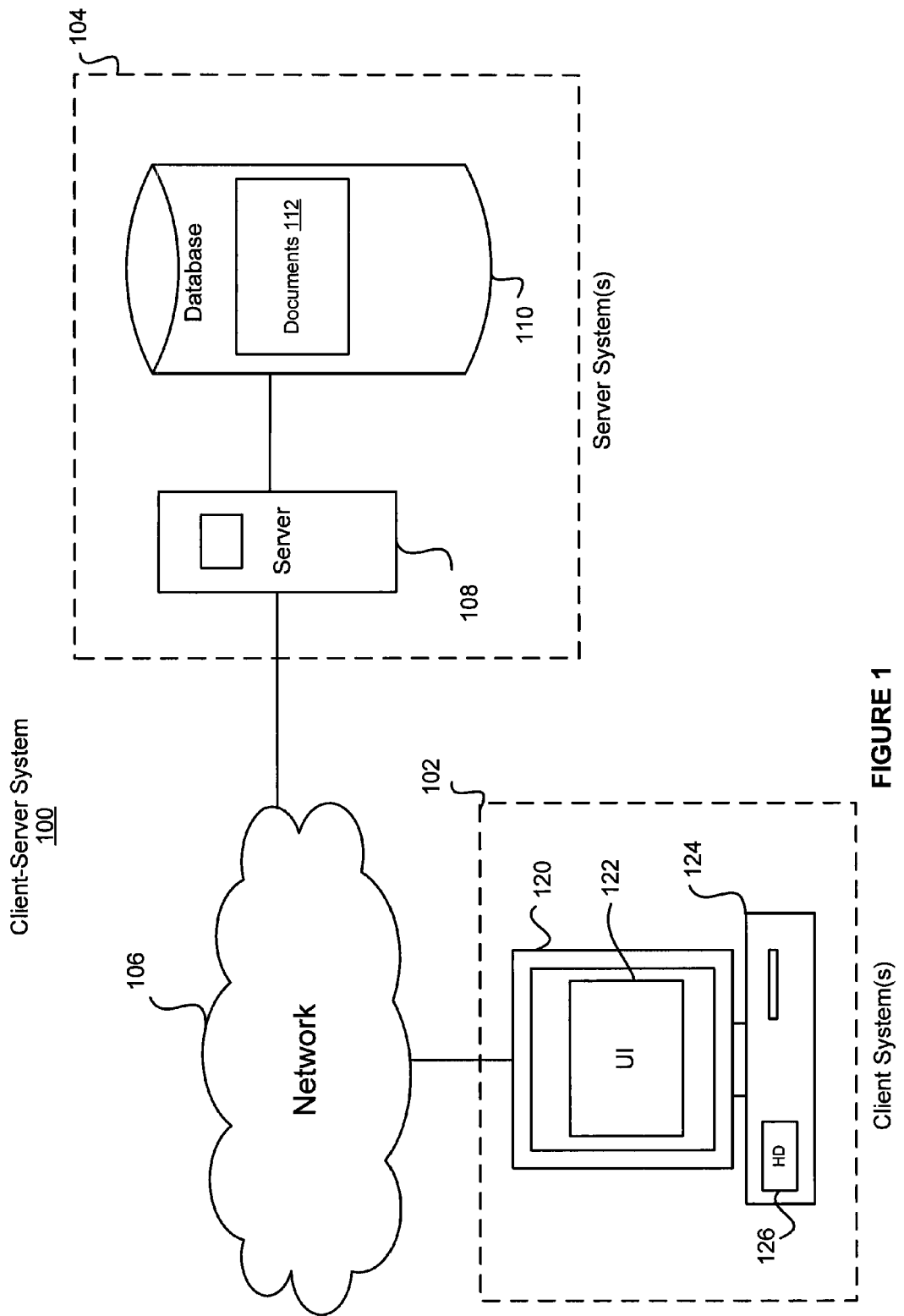
FIG. 1 is a block diagram illustrating a client-server system in accordance with some embodiments.

FIG. 1 is a block diagram illustrating a client-server system 100 in accordance with some embodiments. The client-server system 100 includes a server system 104 coupled to client systems 102 by a network 106. The network 106 is any suitable wired and/or wireless network and may include a local area network (LAN), wide area network (WAN), virtual private network (VPN), the Internet, metropolitan area network (MAN), or any combination of such networks.

The server system 104 includes a server 108 and a database 110. The server 108 serves as a front-end for the server system 104 and provides an interface between the server system 104 and the client systems 102. In some embodiments, the functions of the server 108 may be divided or allocated among two or more servers. It should be appreciated that the server system 104, including the server 108 and the database 110, may be implemented as a distributed system of multiple computers. However, for convenience of explanation, the server system 104 is described herein as being implemented on a single computer, which can be considered a single logical system.

The database 110 stores documents 112. For example, the database 110 stores html code for web pages. For a respective document, the database 110 stores multiple versions of the document (e.g., of the web page), each of which, when rendered, corresponds to a distinct locale. In some embodiments, a locale corresponds to a common language, dialect, spelling convention, grammatical convention, currency, and/or other convention that affects that content or formatting of a document. Examples of conventions that can be particular to a respective locale include linguistic, numerical, financial, and/or political conventions. For example, a locale could correspond to a geographical region or set of geographical regions with a common language, dialect, spelling convention, grammatical convention, currency, and/or other convention. A single geographical or political region could correspond to multiple locales, for example if multiple languages are spoken in the region.

A user interfaces with the server system 104 at a client system or device 102 (hereinafter called the client system 402 for ease of reference). The client system 102 includes a computer 124 or computer controlled device, such as a personal digital assistant (PDA), cellular telephone or the like. The computer 124 typically includes one or more processors (not shown); memory, which may include volatile memory (not shown) and non-volatile memory such as a hard disk drive 126; and a display 120. The computer 124 may also have input devices such as a keyboard and a mouse (not shown). A user may interact with the server system 104 via a user interface 122 (e.g., the user interface of a web browser) presented on the display 120.

Each client system 102 is located in a particular locale. Alternatively, a user of a respective client system 102 is associated with a particular locale (e.g., a Russian user who is in America may want to access a Russian version of a document, as opposed to an American version of the document). The client system 102 receives a request from the user for a document and transmits the request to the server system 104. In response, the server system 104 transmits to the client system 102 the version of the document 112 corresponding to the locale of the client system 102 (or the locale of the user). The client system 102 renders and displays the document 112 (e.g., in the UI 122). Alternatively, the server system 104 renders the document 112 and transmits the rendered document to the client system 102 for display. If the rendering corresponding to the particular locale has formatting problems, however, the user will have difficulty viewing the rendering, resulting in an unpleasant user experience.

When a document that has been formatted for a first locale is modified for a second locale, the modification can introduce formatting problems. For example, a web page, when translated to languages that are different from the language in which the web page was originally developed, can exhibit problems with formatting that cause the page to look different from the developer's original intentions when rendered and displayed. Words or expressions can differ widely in length, for example, when translated to different languages. These different lengths can cause a table with fixed formatting (e.g., fixed column widths) or a page with a specific layout of elements to be displayed differently than how the developer intended (i.e., with broken formatting), which can confuse users and/or deemphasize or hide important information.

To ensure, prior to transmitting a document to a client system 102, that a rendering of the document corresponding to a particular locale does not have formatting problems, the rendering is automatically compared to another rendering of the document that corresponds to a different locale and has been verified to have proper formatting. The rendering with proper formatting serves as a reference rendering for the automated comparison. The comparison identifies differences in display characteristics of textual elements of the renderings. These differences represent possible formatting errors in the rendering corresponding to the particular locale. An automatically-generated report lists these differences for review by the document developer, who can then correct the formatting based on the report. This process of automated comparison and report generation (e.g., as described below for the method 300, FIG. 3A) is performed by a tool that is used, for example, at the time the document is developed or prior to making the document available for download by client systems 102, after different versions of the document (e.g., web page) have been produced for different locales. This tool allows the developer(s) to determine whether translation of the document, or other locale-specific modification of the document, has broken the desired formatting of the document, and thus allows the developer(s) to correct the broken formatting to ensure optimal presentation of the document and to ensure consisting appearance of the document in different locales (e.g., in all locales).

Figure 2A:
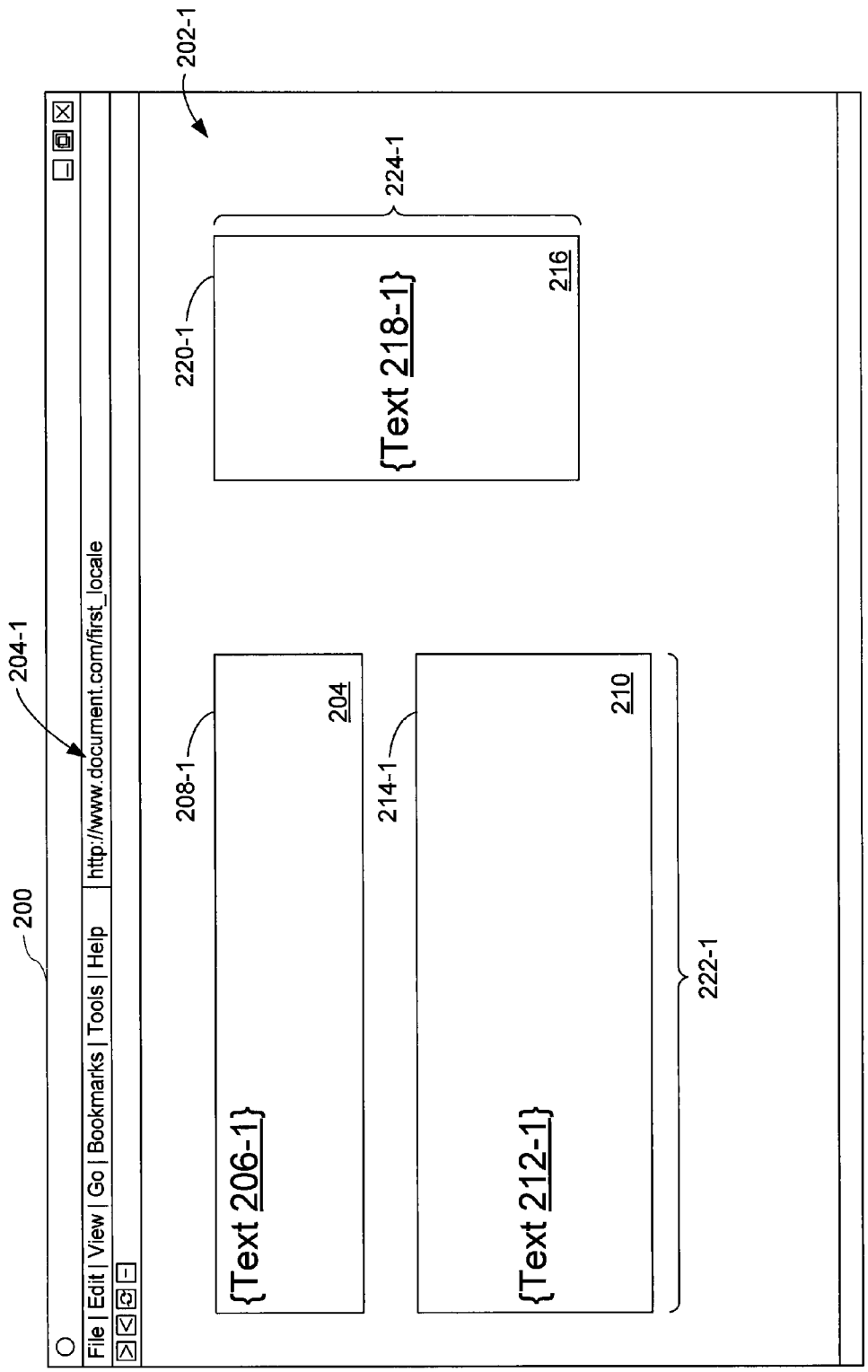
FIGS. 2A-2E are block diagrams illustrating a user interface displaying a rendering of a document in accordance with some embodiments.

FIG. 2A is a block diagram illustrating a user interface of a web browser 200 displaying a first rendering 202-1 of a web page or other document, as specified by a URL 204-1, in accordance with some embodiments. The first rendering 202-1 of the document corresponds to a first locale. The document (as shown in the first rendering 202-1) has various defined portions that include text and are referred to as textual elements. For example, a textual element 204 includes text 206-1; a textual element 210 includes text 212-1, and a textual element 216 includes text 218-1. The text 206-1, 212-1, and 218-1 is shown as being left justified in the respective textual elements 204, 210, and 216. The text 206-1, 212-1, and 218-1 could be left-justified, for example, because it is in a language of the first locale that reads left to right. Each textual element is enclosed by a bounding box that defines the size of the textual element: the textual element 204 is enclosed by a bounding box 208-1, the textual element 210 is enclosed by a bounding box 214-1, and the textual element 216 is enclosed by a bounding box 220-1. The bounding boxes 208-1, 214-1, and 220-1 may or may not be displayed, however. Each bounding box has a width and a height. For example, the bounding box 214-1 has a width 222-1 and the bounding box 220-1 has a height 224-1.

In some embodiments, textual elements (e.g., textual elements 204, 210, and 216) are specified by corresponding tags in html code. Examples of textual elements include, without limitation, DIV elements specified by the <div> tag, SPAN elements specified by the <span> tag, table headers specified by the <th> tag, table rows as specified by the <tr> tag, and list items as specified by the <li> tag.

Figure 2B:
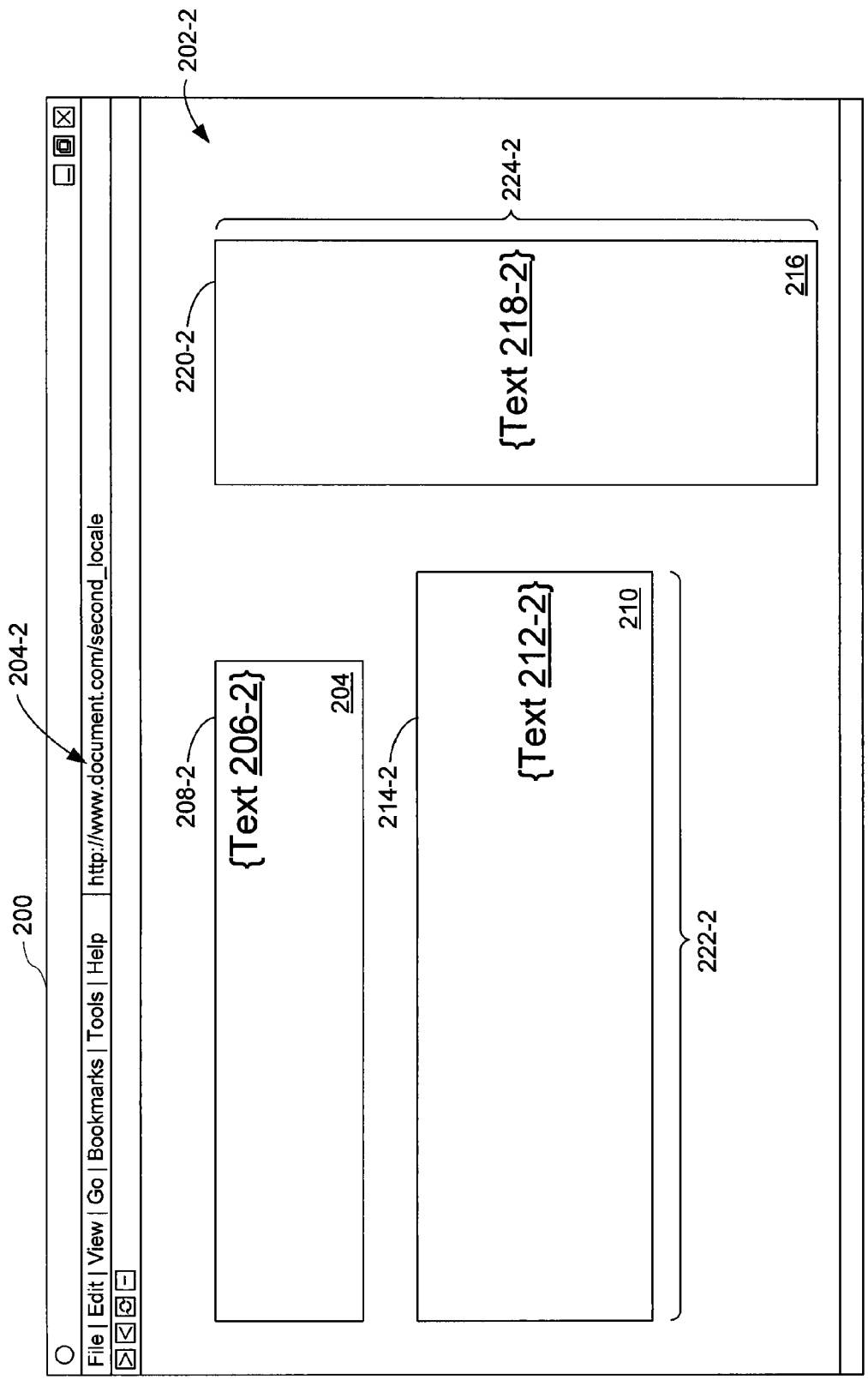

FIG. 2B illustrates a user interface of a web browser 200 displaying a second rendering 202-2 of the document for which the first rendering 202-1 is shown in FIG. 2A. The second rendering 202-2 corresponds to a second locale that is distinct from the first locale corresponding to the first rendering 202-1. In the second rendering 202-2, the text 206-2, 212-2, and 218-2 of the textual elements 204, 210, and 216 is shown as being right-justified, whereas the text 206-1, 212-1, and 218-1 of the textual elements 204, 210, and 216 in the first rendering 202-1 (FIG. 2A) is left-justified. This difference in alignment of the text could result, for example, from the text 206-2, 212-2, and 218-2 being in a language of the second local that reads right to left, whereas the language of the first locale, which is used for the text 206-1, 212-1, and 218-1 (FIG. 2A), reads left to right. However, this difference in alignment of the text also could result from a formatting error in the rendering 202-2.

Comparison of the second rendering 202-2 (FIG. 2B) to the first rendering 202-1 (FIG. 2A) also shows that the width 222-2 of the bounding box 214-2 of the element 210 in the second rendering 202-2 has increased with respect to the width 222-1 of the bounding box 214-1 of the same element 210 in the first rendering 202-1. Also, the height 224-2 of the bounding box 220-2 of the element 216 in the second rendering 202-2 has increased with respect to the height 224-1 of the bounding box 220-1 of the same element 216 in the first rendering 202-1. Assuming that the formatting of the first rendering 202-1 has been verified, thereby allowing the first rendering 202-1 to serve as a reference, each of these differences between the second rendering 202-2 and the first rendering 202-1 represents a possible formatting error in the second rendering 202-2. For example, if the textual element 210 is a table header (e.g., as specified by the html <th> tag) (with other elements of the table not shown in FIGS. 2A and 2B for simplicity), the increase in the width 222-2 with respect to the width 222-1 could indicate that the layout of the table is broken in the second rendering 202-2. If the increase in the height 224-2 with respect to the height 224-1 is greater than a specified amount (e.g., a specified number of pixels, for example, 5 pixels, or a specified relative amount, for example, 10%), the increase could indicate that the number of lines of text in the element 216 has increased in the second rendering 202-2 as compared to the first rendering 202-1, which could be a formatting error. The document developer would want to review these differences to determine whether the differences actually result from formatting errors or instead are intentional or acceptable. As described below for the method 300 (FIG. 3A), these differences can be automatically identified and a report listing these differences can be automatically provided to the developer.

Figure 2C:
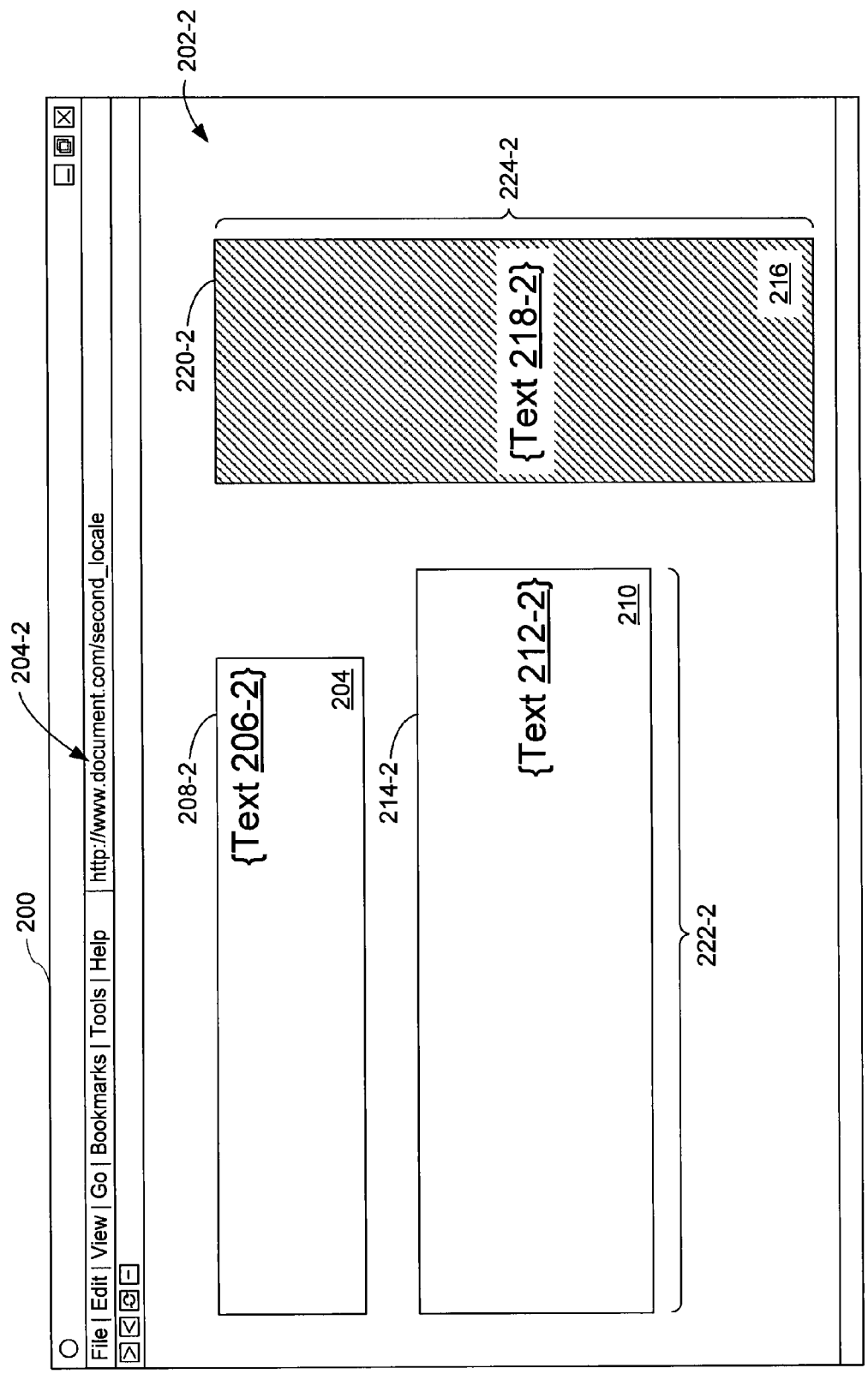
Figure 2D:
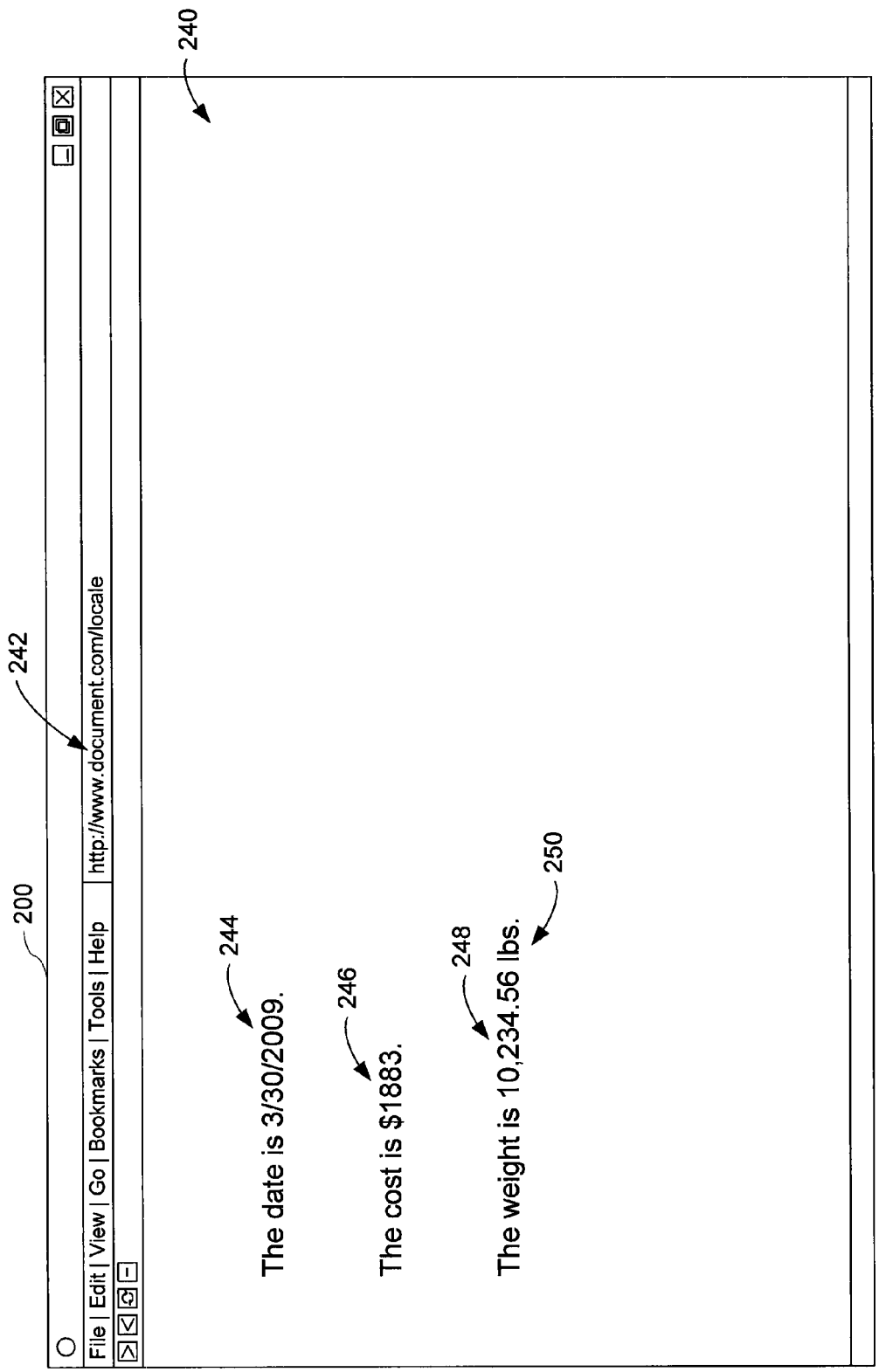

FIG. 2D illustrates a user interface of a web browser 200 displaying a rendering 240 of a web page or other document. The rendering 240 corresponds to a particular locale. The rendering 240 includes a date 224, a currency value 246, and a numerical value 248 with an associated unit of measure 250. The date 224 ("3/30/2009") has a format of MMDDYYYY: the month is listed first, followed by the day, followed by the year. If, however, the locale corresponding to the rendering 240 uses a date convention of DDMMYYYY (i.e., the day is listed first, followed by the month, followed by the year), then the rendering of the date 244 as shown in FIG. 2D could be a formatting error, although it might be intentional.

The currency value 246 ("$1883") is shown in dollars, as indicated by the currency symbol ("$"). If, however, the locale corresponding to the rendering 240 uses a different currency (e.g., euros) with a different currency symbol, then the rendering of the currency value 246 as shown in FIG. 2D could be a formatting error, although it might be intentional.

The numerical value 248 ("10,234.56") has a format that would be expected, for example, in an American locale. In a different locale (e.g., Germany), a different format (e.g., "10 234,56") would be expected, in which case the rendering of the numerical value 248 as shown in FIG. 2D could be a formatting error, although it might be intentional. The unit of measure 250 is pounds, as also would be expected in an American locale. If, however, the locale corresponding to the rendering 240 uses a different unit of measure (e.g., kilograms), then the rendering of the unit of measure 250 as shown in FIG. 2D could be a formatting error, although, again, it might be intentional.

The document developer would want to review any discrepancies between the actual formatting of the date 224, currency value 246, numerical value 248, and unit of measure 250 and the expected formatting for the locale to determine whether the discrepancies actually result from formatting errors or instead are intentional or acceptable. As described below for the method 350 (FIG. 3B), these discrepancies can be automatically identified and a report listing them can be automatically provided to the developer, who can then correct the formatting. This process of automatically identifying formatting discrepancies and generating a report (e.g., as described below for the method 350, FIG. 3B) is performed by a tool that is used, for example, at the time the document is developed or prior to making the document available for download by client systems 102, after different versions of the document (e.g., web page) have been produced for different locales. This tool allows the developer(s) to identify potential formatting errors resulting from modification of a document for a specific locale, and thus allows the developer(s) to correct the broken formatting to ensure optimal presentation of the document in the locale.

Figure 3A:
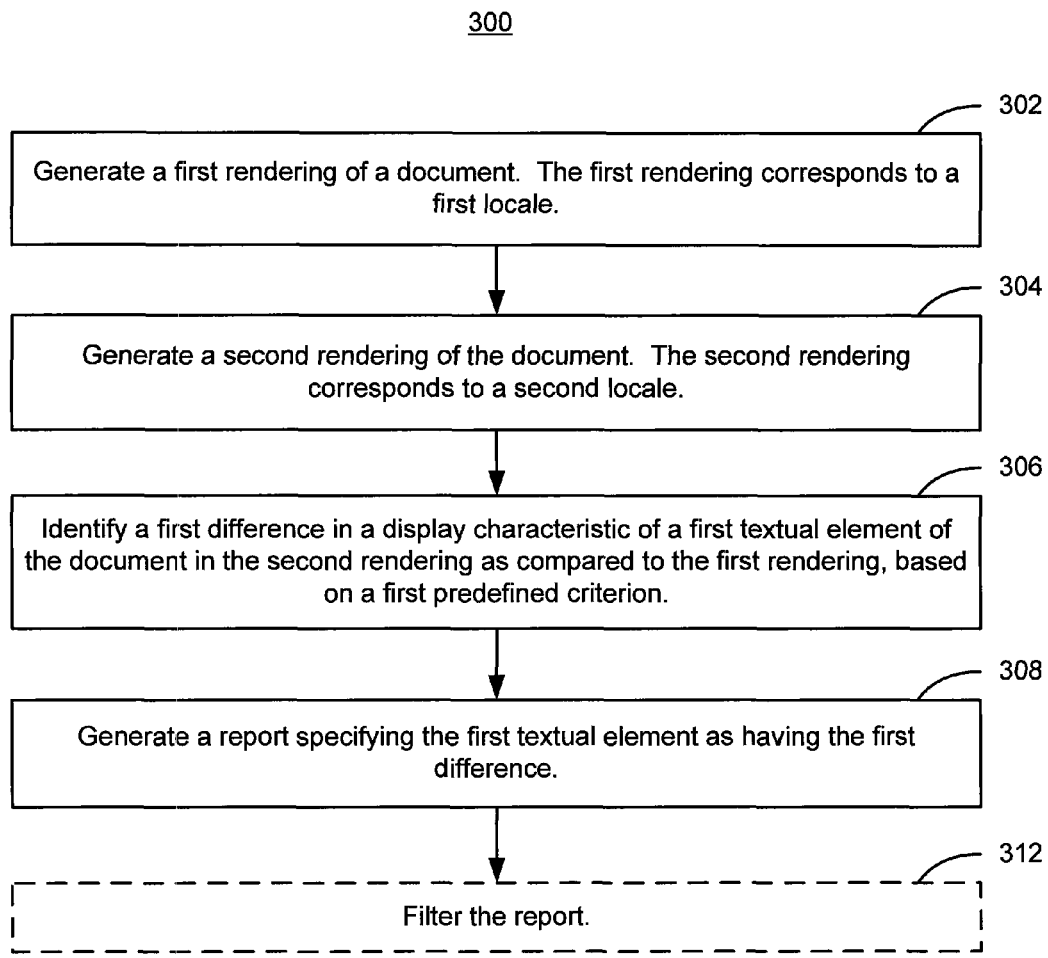
FIGS. 3A-3B are flow diagrams illustrating methods of diagnosing formatting errors in document renderings in accordance with some embodiments.

FIG. 3A is a flow diagram illustrating a method 300 of diagnosing formatting errors in document renderings in accordance with some embodiments. The method 300 is performed, for example, by the server computer 500 (FIG. 5), which may be included in or coupled to the server system 104 (FIG. 1).

In the method 300, a first rendering of a document (e.g., rendering 202-1, FIG. 2A) is generated (302). The first rendering corresponds to a first locale. A second rendering of the document (e.g., rendering 202-2, FIG. 2B) is generated (304). The second rendering corresponds to a second locale. In some embodiments, the first rendering has been verified to have correct formatting or corresponds to a locale for which the formatting is presumed to be correct, and thus serves as a reference rendering. For example, the first rendering is a rendering of an initial version of the document as developed for the first locale. The document developer(s) can specify a particular rendering to be the first rendering and thus to serve as a reference rendering. For example, the developer(s) can specify the rendering to be used as the first rendering as part of a command that initiates the method 300.

A first difference is identified (306) in a display characteristic of a first textual element (e.g., textual element 204, 210, or 216, FIGS. 2A-B) of the document in the second rendering as compared to the first rendering, based on a first predefined criterion.

In some embodiments, the first predefined criterion specifies an amount by which a dimension (e.g., width or height) of a bounding box in the second rendering may exceed a corresponding dimension of the corresponding bounding box in the first rendering without being considered different. Identifying (306) the first difference includes determining that a dimension of a bounding box for the first textual element in the second rendering exceeds a corresponding dimension of a bounding box for the first textual element in the first rendering by more than the specified amount. In some embodiments, the specified amount is greater than zero (e.g., is a non-zero number of pixels or a relative amount greater than 0%). Alternatively, the specified amount is zero, such that any difference between a dimension of a bounding box for the first textual element in the second rendering and the corresponding dimension in the first rendering is identified in the operation 306.

For example, the first difference is identified (306) by determining that the height 224-2 of the textual element 216 in the second rendering 202-2 (FIG. 2B) exceeds the height 224-1 of the textual element 216 in the first rendering 202-1 (FIG. 2A) by the specified amount (e.g., by a specified number of pixels, for example, five pixels or zero pixels) (e.g., by a specified relative amount, for example, 10% or 0%). In another example, the first difference is identified by determining that the width 222-2 of the textual element 210 in the second rendering 202-2 (FIG. 2B) exceeds the width 222-1 of the textual element 210 in the first rendering 202-1 (FIG. 2A) by the specified amount (e.g., by a specified number of pixels, for example, five pixels or zero pixels) (e.g., by a specified relative amount, for example, 10% or 0%).

In some embodiments, identifying (306) the first difference includes determining that a number of display lines for the text of the first textual element in the second rendering exceeds, by at least a specified amount, a number of display lines for the text of the first textual element in the first rendering. For example, it is determined that the text 218-2 of the textual element 216 in the second rendering 202-2 (FIG. 2B) occupies a number of lines that exceeds a number of lines occupied by the text 218-1 of the textual element 216 in the first rendering 202-1 (FIG. 2A) by a specified number of lines. In some embodiments, the specified number of lines corresponds to a specified number of pixels, and the number of lines occupied by the text 218-1 and 218-2 is determined as a function of the heights 224-1 and 224-2 of the corresponding bounding boxes 220-1 and 220-2.

In some embodiments, identifying (306) the first difference includes determining that alignment or justification of the text of the first textual element in the second rendering differs from alignment or justification of the text of the first textual element in the first rendering. For example, the text 206-2 in the second rendering 202-2 is determined to be right-justified while the corresponding text 206-1 in the first rendering 202-1 is determined to be left-justified. A difference in justification or alignment could be intentional but also could be the result of a formatting error and thus should be identified and reported.

In some embodiments, a script is run to measure dimensions of corresponding bounding boxes in the first and second renderings. The measured dimensions are used to determine whether dimensions of bounding boxes for textual elements in the second rendering exceed corresponding dimensions of bounding boxes for corresponding textual elements in the first rendering. The script updates code for the document (e.g., code for a document 112 stored in the database 110, FIG. 1) to include the measured dimensions. For example, a bounding box dimensions table 400 is created, as illustrated in FIG. 4A in accordance with some embodiments, and associated with the code for the document. The table 400 includes a row 402 for each textual element in a document (e.g., textual elements 204, 210, and 216, FIGS. 2A-2B). Each row 402 includes a location descriptor field 404 that specifies the location of the corresponding textual element in the document, a height field 406 that specifies the height of the bounding box of the corresponding textual element, and a width field 408 that specifies the width of the bounding box of the corresponding textual element. Alternatively, the dimensions of respective bounding boxes are added to the code defining the respective textual elements.

The location descriptors are implemented, for example, using)(Path, which is a language that provides syntax for defining parts of an XML document. XPath thus provides path expressions for nodes, including textual elements, of XML documents; these path expressions serve as location descriptors. A location descriptor implemented using XPath is referred to herein as an "xpath."

A report is generated (308) specifying the first textual element as having the first difference.

In some embodiments, the report includes a screenshot of the second rendering, annotated to indicate the first difference. For example, the first difference is a difference between the heights 224-2 and 224-1 that exceeds a predefined amount, and the report includes a screenshot of the rendering 202-2 in which the textual element 216 is highlighted to indicate the difference, as illustrated in FIG. 2C in accordance with some embodiments. The fill pattern for the textual element 216 in FIG. 2C indicates highlighting. Other examples of annotations to indicate the first difference include putting a border around the first textual element, changing the color of text in the first textual element, causing the first textual element to flash, or displaying a warning symbol or warning message next to or on top of the first textual element.

In some embodiments, the report includes the content of the first textual element having the first difference. For example, the first difference is a difference for the textual element 204, and the report includes the text 206-2 of the textual element 204 in the second rendering 202-2 (FIG. 2B).

In some embodiments, the report includes a location descriptor (e.g., an xpath) of the first textual element having the first difference. For example, if the first textual element having the first difference is the textual element 216 (FIGS. 2A-2B), the location descriptor is a descriptor of the location of the textual element 216.

In some embodiments, the report includes a warning code for the first textual element. The warning code corresponds to the first predefined criterion and thus provides an indication of the type of formatting error that may affect the first textual element.

In some embodiments, the first textual element has an element type, and the first predefined criterion applies to every textual element of that element type in the document. For example, the first textual element has an element type as defined by an html lag (e.g., <div>, <span>, <th>, <tr>, <li>, or other appropriate tag) or other element-definition code, and the first predefined criterion applies to every textual element in the document with the same html tag or other element-definition code. The operation 306 is performed repeatedly to determine whether each textual element of the same element type as the first textual element has a difference, based on the first predefined criterion, between the first and second renderings. In one example, the textual elements 204 and 210 are both DIV elements, the first predefined criterion specifies that the justification of text in different renderings of the DIV elements should match, and the operation 306 is repeated for the textual elements 204 and 210 to identify differences in justification between the text 206-2 and 206-1 and between the text 212-2 and 212-1. These differences are included in the report generated in operation 308.

In some embodiments, instead of applying a predefined criterion to every textual element of a particular element type, the document includes code to specify that the predefined criterion either applies or does not apply to respective textual elements. For example, code defining a textual element is annotated to indicate that one or more predefined criteria either do or do not apply to that textual element. A criterion can be predefined to apply to every textual element of a particular element type unless the code for a textual element indicates that the criterion does not apply, or can be predefined to apply only to textual elements with code indicating that the criterion applies.

In another example, the document includes a file, separate from code defining the first textual element, that specifies the textual elements to which the first predefined criterion applies. In some embodiments, the file includes location descriptors (e.g., xpaths) to associate the first predefined criterion (and any other predefined criteria) with respective textual elements. For example, the file includes a criteria specification table 420, illustrated in FIG. 4B in accordance with some embodiments, which includes a row 422 for each textual element in a document (e.g., textual elements 204, 210, and 216, FIGS. 2A-2B). Each row 422 includes a location descriptor field 424 that specifies the location of the corresponding textual element in the document (e.g., using XPath) and a field 426 that includes a flag to indicate whether the first predefined criterion applies to the textual element corresponding to the row 422. In some embodiments, each row 422 includes additional fields with flags to indicate whether additional predefined criterion apply to the textual element corresponding to the row 422. For example, the field 428 includes a flag to indicate whether a second predefined criterion applies to the textual element corresponding to the row 422.

In some embodiments, the method 300 further includes identifying a plurality of differences in visual appearance of textual elements of the document in the second rendering as compared to the first rendering. Each difference corresponds to one of a plurality of predefined criteria including the first criterion. The report generated during operation 308 specifies the textual elements identified as having the differences and also specifies the predefined criteria associated with the identified differences. For example, the report includes, for respective textual elements having respective differences, warning codes associated with predefined criteria that correspond to the respective differences. A different warning code is associated with each predefined criterion. The report also includes location descriptors (e.g., xpaths) or other identifiers of the textual elements specified in the report.

In some embodiments, the report corresponds to a table of differences 440, as illustrated in FIG. 4C in accordance with some embodiments. The table 440 is generated, for example, through repeated performance of the operation 306 for various textual elements and predefined criteria. The table 440 includes a row 442 for each identified difference in a display characteristic of a textual element in the second rendering as compared to the first rendering, based on a respective predefined criterion. Each row includes a location descriptor field 444 to identify the textual element and a warning code field 446 with a warning code corresponding to the respective predefined criterion. A single textual element could have multiple rows 442 in the table 440 if the element had multiple differences based on multiple respective predefined criteria. The table 440 is used to generate the report.

In some embodiments, the report is filtered (312) based on one or more filter criteria. For example, the report is filtered using a particular warning code associated with a particular predefined criterion as a filter criterion, to generate a list of textual elements having identified differences that correspond to the particular predefined criterion and not to other predefined criteria associated with other warning codes. In another example, the report is filtered using a particular portion of the document (e.g., one or more textual elements, as specified for example by xpaths or other location descriptors) as a filter criterion, to generate a list of textual elements having identified differences in the particular portion of the document. In general, the report can be filtered using one or more attributes of the identified differences (e.g., using the fields 444 and/or 446 of the table 440, FIG. 4C) as filter criteria. Filtering allows the document developer to identify potential formatting errors of interest quickly.

While the method 300 includes a number of operations that appear to occur in a specific order, it should be apparent that the method 300 can include more or fewer operations, which can be executed serially or in parallel. An order of two or more operations may be changed and two or more operations may be combined into a single operation.

Figure 3B:
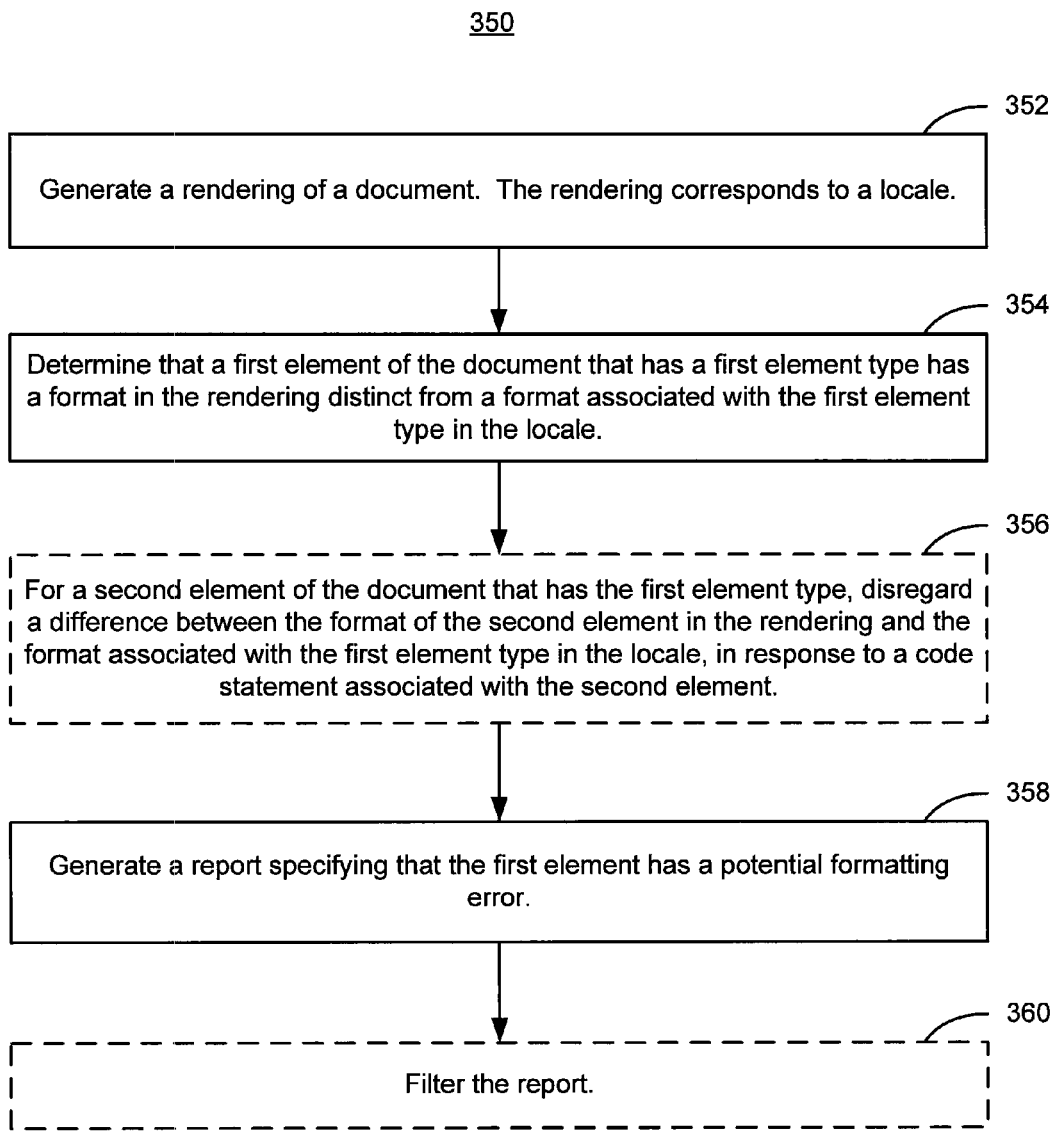

FIG. 3B is a flow diagram illustrating a method 350 of diagnosing formatting errors in document renderings in accordance with some embodiments. The method 350 is performed, for example, by the server computer 500 (FIG. 5), which may be included in or coupled to the server system 104 (FIG. 1).

In the method 350, a rendering of a document (e.g., rendering 240, FIG. 2D) is generated (352). The rendering corresponds to a locale.

A first element of the document has a first element type. It is determined (354) that the first element has a format in the rendering that is distinct from a format associated with the first element type in the locale.

In some embodiments, the first element includes a number, and the determining operation 354 includes detecting that the number has a numerical format distinct from a numerical format for the locale. For example, the rendering 240 (FIG. 2D) corresponds to a locale in which numbers have the format "XX XXX,XX." It is detected that the number 248 ("10,234.56") has a distinct format from the format for numbers in the locale, because its format is "XX,XXX.XX." Had the number 248 been rendered as "10 234,56," no distinction would have been detected.

In some embodiments, the first element includes a currency figure, and the determining operation 354 includes detecting that the currency figure has a currency symbol distinct from a currency symbol for the locale. For example, the rendering 240 (FIG. 2D) corresponds to a locale in which the currency is euros. It is detected that the currency value 246 ("$1883") has a currency symbol distinct from the currency symbol for the locale, because its currency symbol is the dollar sign.

In some embodiments, the first element includes a date, and the determining operation 354 includes detecting that the date is incompatible with a date format for the locale. For example, the rendering 240 (FIG. 2D) corresponds to a locale in which dates are displayed in the DDMMYYYY format. It is detected that the date 244 ("3/30/2009," in the MMDDYYYY format) is incompatible with the date format for the locale.

In some embodiments, the first element includes a unit of measure, and the determining operation 354 includes detecting that the unit of measure of the first element is incompatible with a unit of measure for the locale. For example, the rendering 240 corresponds to a locale in which the unit of measure for weight is kilograms. The unit of measure 250 ("lbs") is determined to be incompatible with the unit of measure for weight in the locale.

FIG. 4D illustrates a locale formatting table 460 that is used in the determining operation 354 in accordance with some embodiments. The table 460 includes a row 462 for each locale. Each row 462 includes a field 464 with the name or other identifier of the locale, a field 466 that specifies a numerical format for the locale, a field 468 that specifies a currency symbol and/or currency format for the locale, a field 470 that specifies a date format for the locale, and a field 472 that specifies a unit of measure for the locale. Each field 466, 468, 470, and 472 thus specifies the expected format in the locale for a respective type of element. Each row 462 can include additional fields (not shown) that specify additional locale-specific formats. In the operation 354, a format of an element in the document is compared to a corresponding format specified in the table 460.

In some embodiments, for a second element of the document that has the first element type, a difference between the format of the second element in the rendering and the format associated with the first element type in the locale is disregarded (356), in response to a code statement associated with the second element. For example, the code statement includes an annotation in the code that defines the second element. Alternatively, the code statement is included in a file separate from the code that defines the second element. The file includes a location descriptor (e.g., an xpath) or other identifier of the second element that serves to associate the code statement with the second element.

In response to determining (354) that the first element has a format in the rendering distinct from a format associated with the first element type in the locale, a report is generated (358) specifying that the first element has a potential formatting error.

Figure 2E:
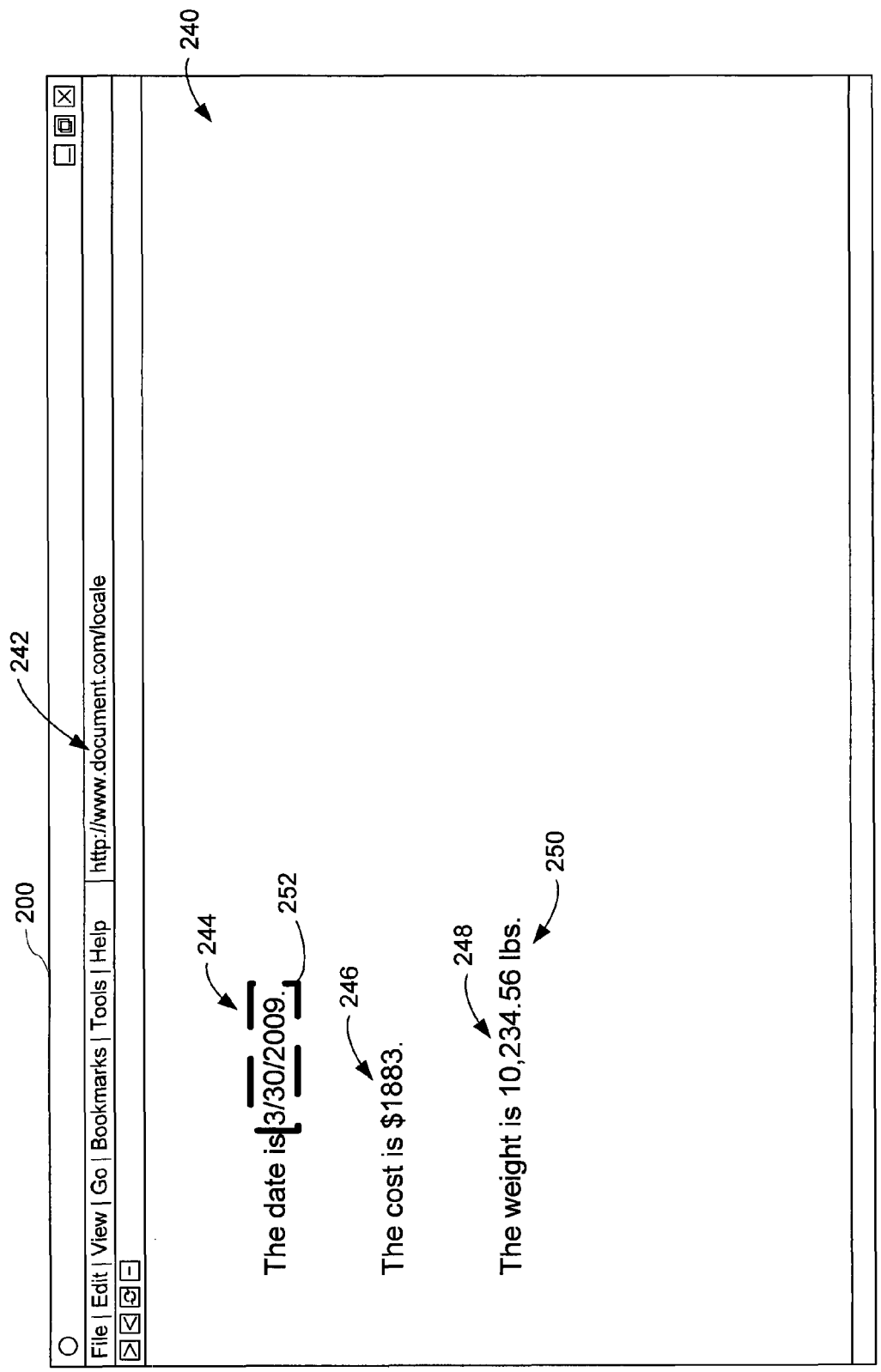

In some embodiments, the report includes a screenshot annotated to indicate that the first element has the potential formatting error. For example, the first element is the date 244 (FIGS. 2D-2E) and the report includes a screenshot of the rendering 240 in which a border 252 (FIG. 2E) is drawn around the date 244 to indicate that the date 244 may have a formatting error. Other examples of annotations to indicate the first difference include highlighting the first element, changing the color of text in the first element, causing the first element to flash, or displaying a warning symbol or warning message next to or on top of the first element.

In some embodiments, the report includes a location descriptor (e.g., an xpath) of the first element. In some embodiments, the report includes a warning code for the first element. For example, the warning code corresponds to the first element type, or to a predefined criterion to be applied to elements of the first element type in the determining operation 354.

In some embodiments, the determining operation 354 is repeated for multiple elements of the document, including elements with different element types. It is determined that respective elements have formats in the rendering that are distinct from formats associated with their respective element types in the locale. For example, it is determined that the date 244, currency value 246, number 248, and unit of measure 250 (FIG. 2D) all have formats that differ from and thus are distinct from formats for their respective element types in the locale corresponding to the rendering 240. The report generated in the operation 358 specifies that the respective elements have potential formatting errors. In some embodiments, the report includes, for the respective elements specified as having potential formatting errors, warning codes associated with respective differences between the formats of the respective elements in the rendering and the formats of the respective element types in the locale. In some embodiments, the report includes respective location descriptors (e.g., xpaths) to indicate the location in the document of the respective elements specified in the report. In some embodiments, the report specifies respective portions of the document in which the elements included in the report are located. For example, the report corresponds to the table 440 (FIG. 4C), with each row 442 corresponding to a distinction between a format of a document element and the expected format of that type of document element in the locale, as determined in operation 354, and the warning code 446 corresponding to the element type.

In some embodiments, the report is filtered (360) based on one or more filter criteria. For example, the report is filtered using a particular warning code as a filter criterion, to generate a list of elements having formatting differences that correspond to the particular warning code. In another example, the report is filtered using a particular portion of the document (e.g., one or more textual elements, as specified for example by xpaths or other location descriptors) as a filter criterion, to generate a list of elements that have potential formatting errors and are located in the particular portion of the document. In general, the report can be filtered using one or more attributes of the elements specified in the report as having potential formatting errors (e.g., using the fields 444 and/or 446 in the table 440, FIG. 4C) as filter criteria. Filtering allows the document developer to identify potential formatting errors of interest quickly.

While the method 350 includes a number of operations that appear to occur in a specific order, it should be apparent that the method 350 can include more or fewer operations, which can be executed serially or in parallel. An order of two or more operations may be changed and two or more operations may be combined into a single operation.

Figure 5:
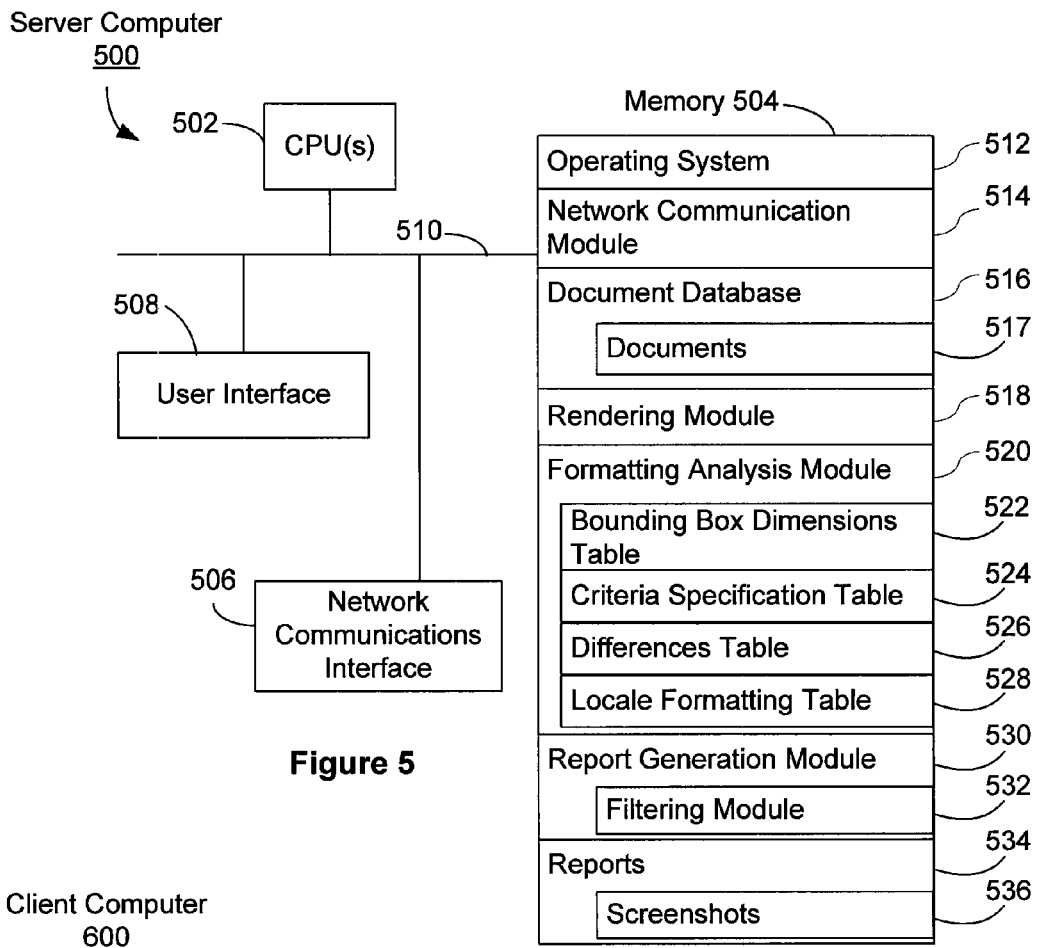
FIG. 5 is a block diagram illustrating a server computer in accordance with some embodiments.

FIG. 5 is a block diagram illustrating a server computer 500 in accordance with some embodiments. The server computer 500, which is an implementation of a server system 104 (FIG. 1), typically includes one or more processing units (CPUs) 502, one or more network or other communications interfaces 506, memory 504, and one or more communication buses 510 for interconnecting these components. The communication buses 510 may include circuitry (sometimes called a chipset) that interconnects and controls communications between system components. The server system 500 optionally may include user interface hardware 508, which may include a display device (not shown), and a keyboard and/or a mouse (not shown). Memory 504 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 504 may optionally include one or more storage devices remotely located from the CPU(s) 502. Memory 504, or alternately non-volatile memory device(s) within memory 504, comprises a computer readable storage medium. In some embodiments, memory 504 stores the following programs, modules and data structures, or a subset thereof:

an operating system 512 that includes procedures for handling various basic system services and for performing hardware dependent tasks;

a network communication module 514 that is used for connecting the server system 500 to other computers via the one or more communication network interfaces 506 and one or more communication networks (e.g., the network 106, FIG. 1), such as the Internet, other wide area networks, local area networks, metropolitan area networks, and so on;

a document database 516 that includes documents 517;

a rendering module 518 to render the documents 517;

a formatting analysis module 520 to analyze the formatting of rendered documents;

a report generation module 530 to generate reports detailing the results of the formatting analysis; and one or more reports 534 generated by the report generation module 530.

The document database 516 is an example of the database 110 (FIG. 1). In some embodiments, the formatting analysis module 520 includes a bounding box dimensions table 522 (e.g., the table 400, FIG. 4A), a criteria specification table 524 (e.g., the table 420, FIG. 4B), a differences table 526 (e.g., the table 440, FIG. 4C), and a locale formatting table 528 (e.g., the table 460, FIG. 4D). In some embodiments, the report generation module 530 includes a filtering module 532 that is used to filter reports. In some embodiments, the reports 534 include screenshots 536, as shown, for example, in FIGS. 2C and 2E. In some embodiments, the rendering module 518, formatting analysis module 520, and report generation module 530 together include instructions to perform all or a portion of the methods 300 (FIG. 3A) and/or 350 (FIG. 3B).

Each of the above identified elements in FIG. 5 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 504 may store a subset of the modules and data structures identified above. Furthermore, memory 504 may store additional modules and data structures not described above.

Although FIG. 5 shows a "server computer," FIG. 5 is intended more as a functional description of the various features which may be present in a set of servers than as a structural schematic of the embodiments described herein. In practice, items shown separately could be combined and some items could be separated. For example, some items shown separately in FIG. 5 could be implemented on single servers and single items could be implemented by one or more servers.

Figure 6:
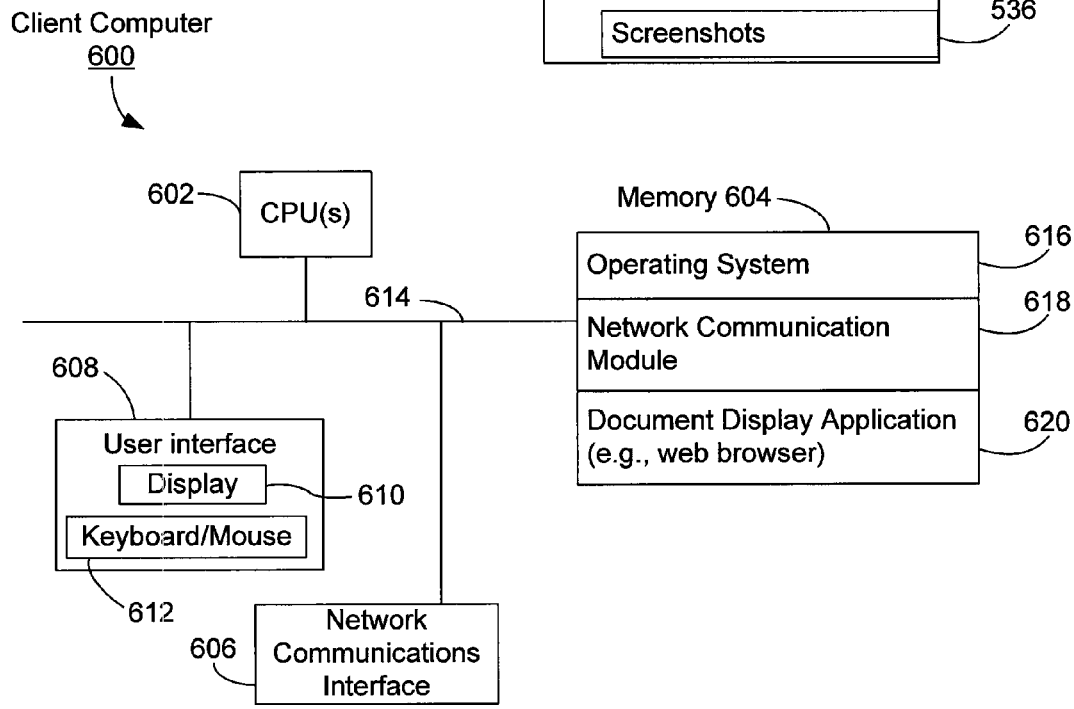
FIG. 6 is a block diagram illustrating a client computer in accordance with some embodiments.

FIG. 6 is a block diagram illustrating a client computer in accordance with some embodiments. The client computer 600, which is an implementation of a client system 102 (FIG. 1), typically includes one or more processing units (CPUs) 602, one or more network or other communications interfaces 606, memory 604, and one or more communication buses 614 for interconnecting these components. The communication buses 614 may include circuitry (sometimes called a chipset) that interconnects and controls communications between system components. The client computer 600 may also include user interface hardware 608 comprising a display device 610 and a keyboard and/or mouse (or other pointing device) 612. Memory 604 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 604 may optionally include one or more storage devices remotely located from the CPU(s) 602. Memory 604, or alternately non-volatile memory device(s) within memory 604, comprises a computer readable storage medium. In some embodiments, memory 604 stores the following programs, modules, and data structures, or a subset thereof:

an operating system 616 that includes procedures for handling various basic system services and for performing hardware dependent tasks;

a network communication module 618 that is used for connecting the client computer 600 to other computers via the one or more communication network interfaces 606 and one or more communication networks (e.g., the network 106, FIG. 1), such as the Internet, other wide area networks, local area networks, metropolitan area networks, and so on; and a document display application 620, such as a web browser (e.g., the web browser 200, FIGS. 2A-2E).

In some embodiments, the methods 300 (FIG. 3A) and/or 350 (FIG. 3B) are initiated in response to a command from a developer at the client computer 600. The methods 300 and/or 350 are then performed by the server computer 500 or a combination of the server computer 500 and client computer 600.

Each of the above identified elements in FIG. 6 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 604 may store a subset of the modules and data structures identified above. Furthermore, memory 604 may store additional modules and data structures not described above.

The foregoing description, for purpose of explanation, has been described with reference to specific embodiments. However, the illustrative discussions above are not intended to be exhaustive or to limit the inventions to the precise forms disclosed. Many modifications and variations are possible in view of the above teachings. The embodiments were chosen and described in order to best explain the principles of the inventions and their practical applications, to thereby enable others skilled in the art to best utilize the inventions and various embodiments with various modifications as are suited to the particular use contemplated.

What is claimed is:

1. A computer-implemented method of diagnosing formatting errors in document renderings, comprising:

in a computer system:

generating a first rendering of a document, the first rendering corresponding to a first locale;

generating a second rendering of the document, the second rendering corresponding to a second locale;

identifying a plurality of differences in visual appearance of display characteristics of a plurality of textual elements of the document in the second rendering as compared to visual appearance of display characteristics of a plurality of textual elements of the document in the first rendering, each of the plurality of differences corresponding to one of a plurality of predefined criteria, and the plurality of the textual elements of the document in the second rendering having second formats distinct from first formats of the plurality of the textual elements of the document in the first rendering, wherein the differences comprise potential formatting errors;

generating a report specifying at least one of the plurality of the textual elements of the document in the second rendering as having the differences, wherein the report comprises a location descriptor specifying a location within the document of the at least one of the plurality of the textual elements of the document in the second rendering having the differences and flags to indicate whether at least one of the plurality of predefined criteria applies to the at least one of the plurality of the textual elements of the document in the second rendering; and filtering the report using the at least one of the predefined criteria to generate a list of the at least one of the plurality of the textual elements of the document in the second rendering having the differences.

2. The computer-implemented method of claim 1, wherein:
the predefined criteria specify an amount by which a dimension of a bounding box in the second rendering may exceed a corresponding dimension of a corresponding bounding box in the first rendering without being considered different; and
the identifying comprises determining that a dimension of a bounding box for one of the plurality of textual elements of the document in the second rendering exceeds a corresponding dimension of a bounding box for one of the plurality of textual elements of the document in the first rendering by more than the amount.

3. The computer-implemented method of claim 2, wherein the amount is either an absolute amount or a relative amount.

4. The computer-implemented method of claim 2, further comprising:
running a script to measure dimensions of corresponding bounding boxes in the first and second renderings; and
automatically updating code for the document to include the dimensions.

5. The computer-implemented method of claim 1, wherein the identifying comprises determining that a height of a specific bounding box for one of the plurality of textual elements of the document in the second rendering exceeds a corresponding height of a specific bounding box for one of the plurality of textual elements of the document in the first rendering by more than a specified amount.

6. The computer-implemented method of claim 1, wherein the identifying comprises determining that a width of a specific bounding box for one of the plurality of textual elements of the document in the second rendering exceeds a corresponding width of a specific bounding box for one of the plurality of textual elements of the document in the first rendering by more than a specified amount.

7. The computer-implemented method of claim 1, wherein the identifying comprises determining that a number of display lines for text of one of the plurality of textual elements of the document in the second rendering exceeds by at least a specified number of display lines for text of one of the plurality of textual elements of the document in the first rendering.

8. The computer-implemented method of claim 1, wherein the determining comprises detecting that justification of text of one of the plurality of textual elements of the document in the second rendering differs from justification of the text of the one of the plurality of textual elements of the document in the first rendering.

9. The computer-implemented method of claim 1, wherein one of the plurality of textual elements of the document in the second rendering has an element type selected from the group consisting of <div>, <span>, <th>, <tr>, and <li>.

10. The computer-implemented method of claim 1, wherein:
one of the plurality of textual elements of the document in the second rendering has an element type; and
a predefined criterion of the plurality of predefined criteria applies to every textual element of the element type in the document.

11. The computer-implemented method of claim 1, wherein:
the document comprises code defining one of the plurality of textual elements of the document in the second rendering; and
the code defining the one of the plurality of textual elements of the document in the second rendering specifies that a predefined criterion of the plurality of predefined criteria applies to the one of the plurality of textual elements of the document in the second rendering.

12. The computer-implemented method of claim 1, wherein:
the document comprises a file separate from code defining one of the plurality of textual elements of the document in the second rendering; and
the file specifies that a predefined criterion of the plurality of predefined criteria applies to the one of the plurality of textual elements of the document in the second rendering.

13. The computer-implemented method of claim 12, wherein the location descriptor associates the predefined criterion of the plurality of predefined criteria with the one of the plurality of textual elements of the document in the second rendering.

14. The computer-implemented method of claim 1, wherein the report comprises a screenshot of the second rendering, the screenshot being annotated to indicate the plurality of differences.

15. The computer-implemented method of claim 1, wherein the report further comprises a warning code for one of the plurality of textual elements of the document in the second rendering, the warning code corresponding to a predefined criterion of the predefined criteria.

16. The computer-implemented method of claim 1, wherein the report comprises content of the at least one of the plurality of the textual elements of the document of in the second rendering having the differences.

17. The computer-implemented method of claim 1, wherein the report comprises, for respective textual elements in the second rendering having respective differences of the plurality of differences, warning codes associated with predefined criteria of the plurality of predefined criteria that correspond to the respective differences.

18. The computer-implemented method of claim 17, further comprising:
filtering the report using a particular warning code associated with a particular predefined criterion of the plurality of predefined criteria as a filter criterion, wherein the list of the at least one of the plurality of the textual elements of the document in the second rendering having the differences corresponds to the particular predefined criterion.

19. The computer-implemented method of claim 1, wherein the report specifies, for the at least one of the textual elements of the document in the second rendering specified in the report, respective portions of the document in which the at least one of the textual elements of the document in the second rendering are located, the method further comprising:

filtering the report using a particular portion of the document as a filter criterion, to generate a second list of textual elements in the second rendering having the differences in the particular portion of the document.

20. A system for diagnosing formatting errors in document renderings, comprising:
    memory;
    a display;
    one or more processors; and
    one or more programs stored in the memory and configured for execution by the one or more processors, the one or more programs including:
        instructions to generate a first rendering of a document, the first rendering corresponding to a first locale;
        instructions to generate a second rendering of the document, the second rendering corresponding to a second locale;
        instructions to identify a plurality of differences in visual appearance of display characteristics of a plurality of textual elements of the document in the second rendering as compared to visual appearance of display characteristics of a plurality of textual elements of the document in the first rendering, each of the plurality of differences corresponding to one of a plurality of predefined criteria, and the plurality of the textual elements of the document in the second rendering having second formats distinct from first formats of the plurality of the textual elements of the document in the first rendering, wherein the differences comprise potential formatting errors; and
        instructions to generate a report specifying at least one of the plurality of the textual elements of the document in the second rendering as having the differences, wherein the report comprises a location descriptor specifying a location within the document of the at least one of the plurality of the textual elements of the document in the second rendering having the differences and flags to indicate whether at least one of the plurality of predefined criteria applies to the at least one of the plurality of the textual elements of the document in the second rendering; and
        instructions to filtering the report using the at least one of the predefined criteria to generate a list of the at least one of the plurality of the textual elements of the document in the second rendering having the differences.

21. The computer-implemented method of claim 1, wherein the location descriptor is implemented using XPath.

* * * * *